(12) United States Patent
Andersen

(10) Patent No.: US 7,948,896 B2
(45) Date of Patent: *May 24, 2011

(54) WEIGHTED-FAIR-QUEUING RELATIVE BANDWIDTH SHARING

(75) Inventor: Erik Andersen, Mountain View, CA (US)

(73) Assignee: Broadcom Corporation, Irvine, CA (US)

( * ) Notice: Subject to any disclaimer, the term of this patent is extended or adjusted under 35 U.S.C. 154(b) by 1730 days.

This patent is subject to a terminal disclaimer.

(21) Appl. No.: 11/060,657

(22) Filed: Feb. 18, 2005

(65) Prior Publication Data

US 2006/0187945 A1     Aug. 24, 2006

(51) Int. Cl.
H04J 3/14      (2006.01)
(52) U.S. Cl. ............... 370/235.1; 370/412; 370/419; 709/233; 709/234
(58) Field of Classification Search ............... 370/229, 370/235, 235.1, 351, 389, 395.1, 395.4, 232, 370/395.21, 230.1, 236, 412–419, 429; 398/58; 709/232–234
See application file for complete search history.

(56) References Cited

U.S. PATENT DOCUMENTS

| | | | |
|---|---|---|---|
| 5,414,704 A | 5/1995 | Spinney | |
| 5,423,015 A | 6/1995 | Chung | |
| 5,610,905 A | 3/1997 | Murthy et al. | |
| 5,892,922 A | 4/1999 | Lorenz | |
| 5,991,295 A | 11/1999 | Tout et al. | |
| 6,016,310 A | 1/2000 | Muller et al. | |
| 6,088,356 A | 7/2000 | Hendel et al. | |
| 6,119,196 A | 9/2000 | Muller et al. | |
| 6,259,699 B1 | 7/2001 | Opalka et al. | |
| 6,335,935 B2 | 1/2002 | Kadambi et al. | |
| 6,366,761 B1* | 4/2002 | Montpetit | 370/412 |
| 6,425,015 B1 | 7/2002 | Jennings et al. | |
| 6,452,933 B1* | 9/2002 | Duffield et al. | 370/415 |
| 6,542,467 B2* | 4/2003 | Umayabashi | 370/236 |
| 6,591,299 B2 | 7/2003 | Riddle et al. | |
| 6,594,234 B1* | 7/2003 | Chard et al. | 370/236 |
| 6,608,815 B1* | 8/2003 | Huang et al. | 370/232 |
| 6,810,012 B1* | 10/2004 | Yin et al. | 370/412 |
| 6,990,113 B1* | 1/2006 | Wang et al. | 370/412 |
| 7,110,359 B1* | 9/2006 | Acharya | 370/235 |
| 2002/0031091 A1* | 3/2002 | van Everdingen | 370/236 |
| 2002/0059408 A1* | 5/2002 | Pattabhiraman et al. | 709/223 |
| 2003/0152096 A1* | 8/2003 | Chapman | 370/412 |
| 2003/0174650 A1* | 9/2003 | Shankar et al. | 370/235 |
| 2003/0231593 A1* | 12/2003 | Bauman et al. | 370/235 |
| 2004/0057438 A1* | 3/2004 | Berger et al. | 370/395.64 |
| 2004/0062259 A1* | 4/2004 | Jeffries et al. | 370/412 |

(Continued)

FOREIGN PATENT DOCUMENTS

EP      0312917 A2     4/1989

(Continued)

*Primary Examiner* — Kwang B Yao
*Assistant Examiner* — Jeffrey M Rutkowski

(57) ABSTRACT

A network device for scheduling packets in a plurality of queues. The network device includes a plurality of configurable mechanisms, each of which is configured to process information in one of a plurality of queues based on a predefined bandwidth. A scheduler services an associated one of the plurality of queues based on the predefined bandwidth. The network device also includes means for tracking whether or not the plurality of queues has exceeded a predefined threshold. If the plurality of queues has exceeded the predefined threshold, a new bandwidth allocation is calculated for each of the plurality of queues. The new bandwidth allocation replaces the predefined bandwidth and is proportional to the predefined bandwidth for each of the plurality of queues.

16 Claims, 6 Drawing Sheets

| U.S. PATENT DOCUMENTS | | | | FOREIGN PATENT DOCUMENTS | | |
|---|---|---|---|---|---|---|
| 2004/0136379 A1* | 7/2004 | Liao et al. | 370/395.21 | EP | 0785699 A2 | 7/1997 |
| 2004/0160982 A1* | 8/2004 | Gorsuch et al. | 370/468 | EP | 1093266 A2 | 4/2001 |
| 2005/0186933 A1* | 8/2005 | Trans | 455/296 | WO | WO 99/00938 | 1/1999 |
| 2005/0249497 A1* | 11/2005 | Haran et al. | 398/58 | WO | WO 99/00949 | 1/1999 |
| 2005/0281279 A1* | 12/2005 | Dennison et al. | 370/412 | WO | WO 99/00950 | 1/1999 |
| 2006/0114912 A1* | 6/2006 | Kwan et al. | 370/395.4 | | | |

* cited by examiner

WEIGHTED-FAIR-QUEUING RELATIVE BANDWIDTH SHARING

BACKGROUND OF THE INVENTION

1. Field of the Invention

The present invention relates to a network device in a packet switched network and more particularly to a method of scheduling packets in multiple queues to guarantee quality of service.

2. Description of the Related Art

A packet switched network may include one or more network devices, such as a Ethernet switching chip, each of which includes several modules that are used to process information that is transmitted through the device. Specifically, the device includes an ingress module, a Memory Management Unit (MMU) and an egress module. The ingress module includes switching functionality for determining to which destination port a packet should be directed. The MMU is used for storing packet information and performing resource checks. The egress module is used for performing packet modification and for transmitting the packet to at least one appropriate destination port. One of the ports on the device may be a CPU port that enables the device to send and receive information to and from external switching/routing control entities or CPUs.

As packets enter the device from multiple ports, they are forwarded to the ingress module where switching and other processing are performed on the packets. Thereafter, the packets are transmitted to one or more destination ports through the MMU and the egress module. The MMU enables sharing of packet buffer among different ports while providing resource guarantees for every ingress port, egress port and class of service queue. According to a current switching system architecture, eight class of service queues are associated with each egress port. To ensure bandwidth guarantees across the ports and queues, the device includes a scheduler that provides arbitration across the class of service queues to ensure minimum and maximum bandwidth guarantees. One implementation for ensuring bandwidth guarantees across the queues associated with each port is to assign a fixed portion of the total bandwidth for the port to each queue. As such, a queue that is associated with a class of service with a high priority may be assigned a greater fixed portion than a queue that is associated with a lower priority class of service. The scheduler then processes packets in each queue, for example in a round robin fashion. This implementation is inflexible. For example, when a queue is idle, the bandwidth assigned to that queue is unused even if another queue requires more bandwidth than the amount allocated to it. As such packets may be dropped on one queue that is exceeding its allocated bandwidth while the bandwidth of an idle queue remains unused.

SUMMARY OF THE INVENTION

According to one aspect of the invention, there is provided a network device for scheduling packets in a plurality of queues. The network device includes a plurality of configurable mechanisms, each of which is configured to process information in one of a plurality of queues based on a predefined bandwidth. A scheduler services an associated one of the plurality of queues based on the predefined bandwidth. The network device also includes means for tracking whether or not the plurality of queues has exceeded a predefined threshold. If the plurality of queues has exceeded the predefined threshold, a new bandwidth allocation is calculated for each of the plurality of queues. The new bandwidth allocation replaces the predefined bandwidth and is proportional to the predefined bandwidth for each of the plurality of queues.

According to another aspect of the invention, there is provided a method for scheduling packets in a plurality of queues. The method includes the steps of configuring a plurality of configurable mechanisms to process information in a plurality of queues based on a predefined bandwidth and tracking if the plurality of queues has exceeded a predefined threshold. The method also includes the step of calculating a new bandwidth allocation for each of the plurality of queues if the plurality of queues has exceeded the predefined threshold. The new bandwidth allocation replaces the predefined bandwidth and is proportional to the predefined bandwidth for each of the plurality of queues.

According to another aspect of the invention, there is provided an apparatus for scheduling packets in a plurality of queues. The apparatus includes configuring means for configuring a plurality of configurable mechanisms to process information in a plurality of queues based on a predefined bandwidth. The apparatus also includes tacking means for tracking if the plurality of queues has exceeded a predefined threshold. The apparatus further includes calculating means for calculating a new bandwidth allocation for each of the plurality of queues if the plurality of queues have exceeded the predefined threshold, the new bandwidth allocation replacing the predefined bandwidth and being proportional to the predefined bandwidth for each of the plurality of queues.

BRIEF DESCRIPTION OF THE DRAWINGS

The accompanying drawings, which are included to provide a further understanding of the invention and are incorporated in and constitute a part of this specification, illustrate embodiments of the invention that together with the description serve to explain the principles of the invention, wherein.

DETAILED DESCRIPTION OF PREFERRED EMBODIMENTS

Reference will now be made to the preferred embodiments of the present invention, examples of which are illustrated in the accompanying drawings.

Figure 1:
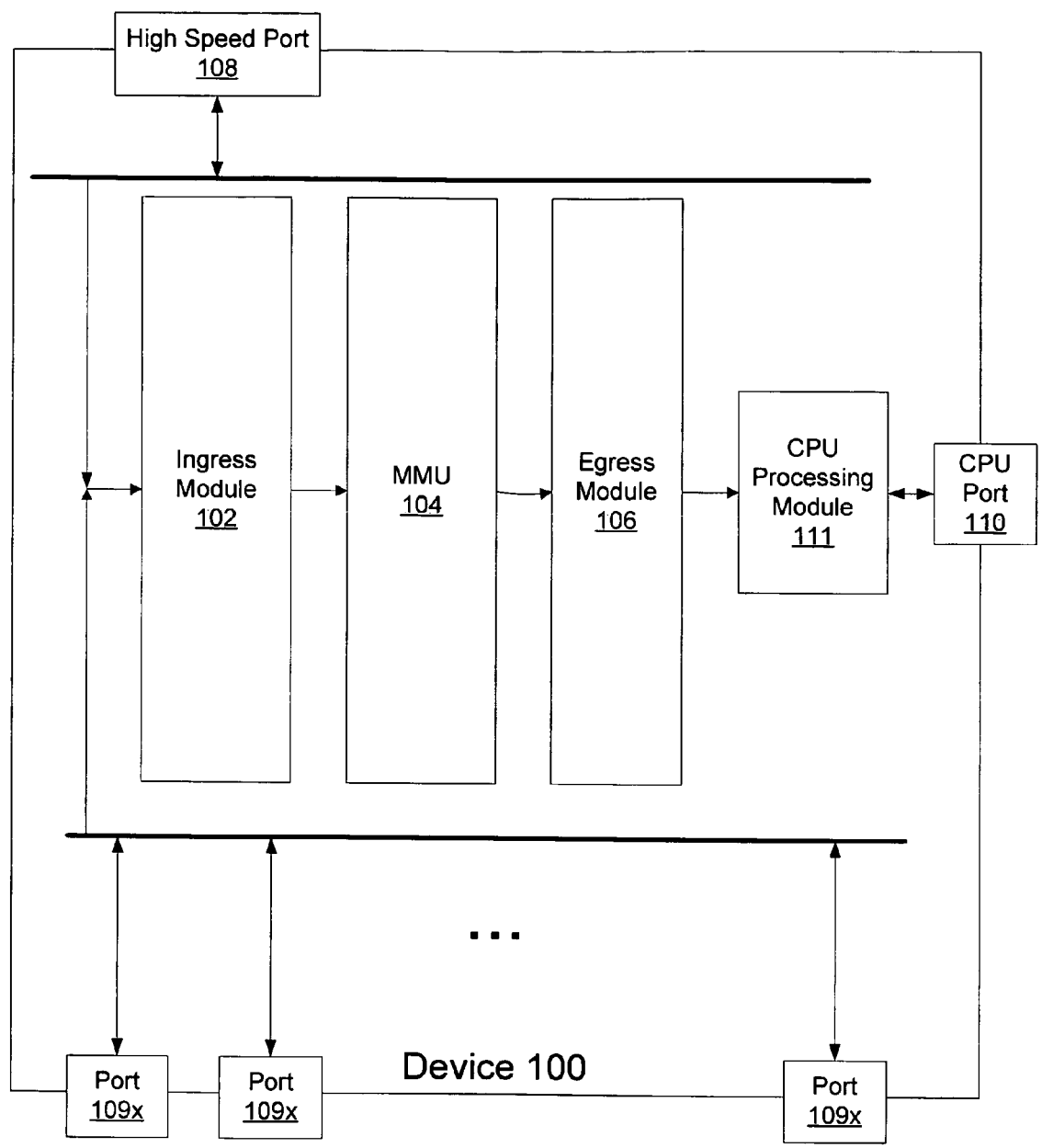
FIG. 1 illustrates a network device in which an embodiment of the present invention may be implemented.

FIG. 1 illustrates a network device, such as a switching chip, in which an embodiment the present invention may be implemented. Device 100 includes an ingress module 102, a MMU 104, and an egress module 106. Ingress module 102 is used for performing switching functionality on an incoming packet. The primary function of MMU 104 is to efficiently manage cell buffering and packet pointer resources in a predictable manner even under severe congestion scenarios. Egress module 106 is used for performing packet modification and transmitting the packet to an appropriate destination port.

Device 100 may also include one internal fabric high speed port, for example a HiGig port, 108, one or more external Ethernet ports 109a-109x, and a CPU port 110. High speed port 108 is used to interconnect various network devices in a system and thus form an internal switching fabric for transporting packets between external source ports and one or more external destination ports. As such, high speed port 108 is not externally visible outside of a system that includes multiple interconnected network devices. CPU port 110 is used to send and receive packets to and from external switching/routing control entities or CPUs. According to an embodiment of the invention, CPU port 110 may be considered as one of external Ethernet ports 109a-109x. Device 100 interfaces with external/off-chip CPUs through a CPU processing module 111, such as a CMIC, which interfaces with a PCI bus that connects device 100 to an external CPU.

Network traffic enters and exits device 100 through external Ethernet ports 109a-109x. Specifically, traffic in device 100 is routed from an external Ethernet source port to one or more unique destination Ethernet ports. In one embodiment of the invention, device 100 supports twelve physical Ethernet ports 109, each of which can operate in 10/100/1000 Mbps speed and one high speed port 108 which operates in either 10 Gbps or 12 Gbps speed.

Figure 2A:
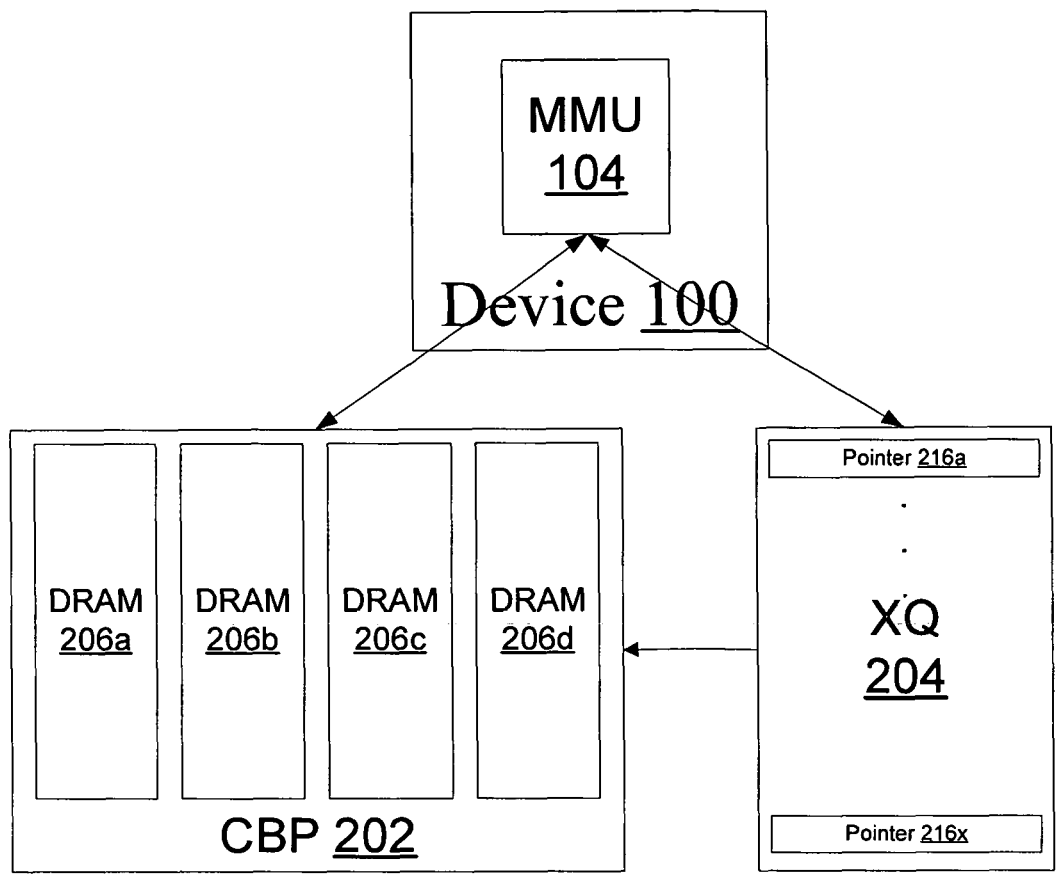
FIG. 2a illustrates the shared memory architecture of the present invention.
Figure 2B:
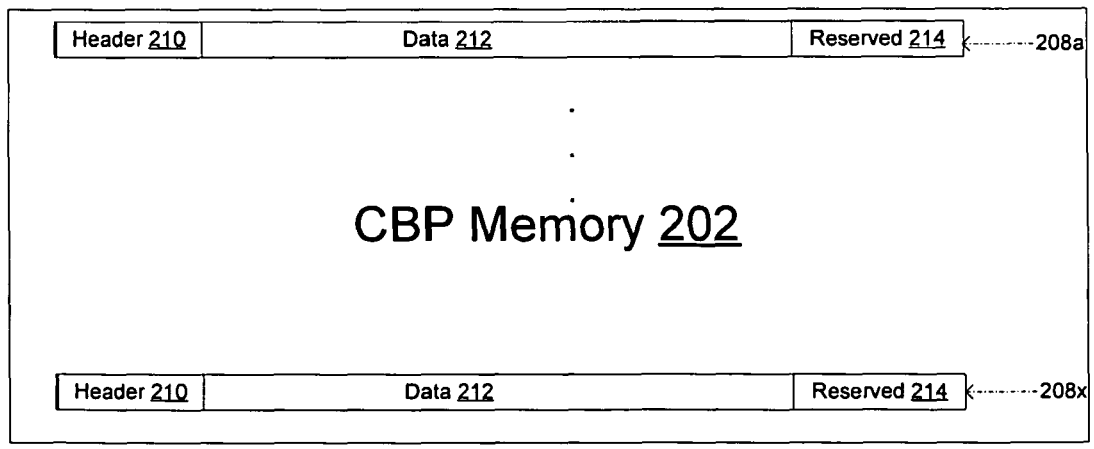
FIG. 2b illustrates the Cell Buffer Pool of the shared memory architecture.

In an embodiment of the invention, device 100 is built around a shared memory architecture, as shown in FIGS. 2a-2b wherein MMU 104 enables sharing of a packet buffer among different ports while providing for resource guarantees for every ingress port, egress port and class of service queue associated with each egress port. FIG. 2a illustrates the shared memory architecture of the present invention. Specifically, the memory resources of device 100 include a Cell Buffer Pool (CBP) memory 202 and a Transaction Queue (XQ) memory 204. CBP memory 202 is an off-chip resource that is made of 4 DRAM chips 206a-206d. According to an embodiment of the invention, each DRAM chip has a capacity of 288 Mbits, wherein the total capacity of CBP memory 202 is 122 Mbytes of raw storage. As shown in FIG. 2b, CBP memory 202 is divided into 256K 576-byte cells 208a-208x, each of which includes a 32 byte header buffer 210, up to 512 bytes for packet data 212 and 32 bytes of reserved space 214. As such, each incoming packet consumes at least one full 576 byte cell 208. Therefore in an example where an incoming includes a 64 byte frame, the incoming packet will have 576 bytes reserved for it even though only 64 bytes of the 576 bytes is used by the frame.

Returning to FIG. 2a, XQ memory 204 includes a list of packet pointers 216a-216x into CBP memory 202, wherein different XQ pointers 216 may be associated with each port. A cell count of CBP memory 202 and a packet count of XQ memory 204 is tracked on an ingress port, egress port and class of service basis. As such, device 100 can provide resource guarantees on a cell and/or packet basis.

Figure 3:
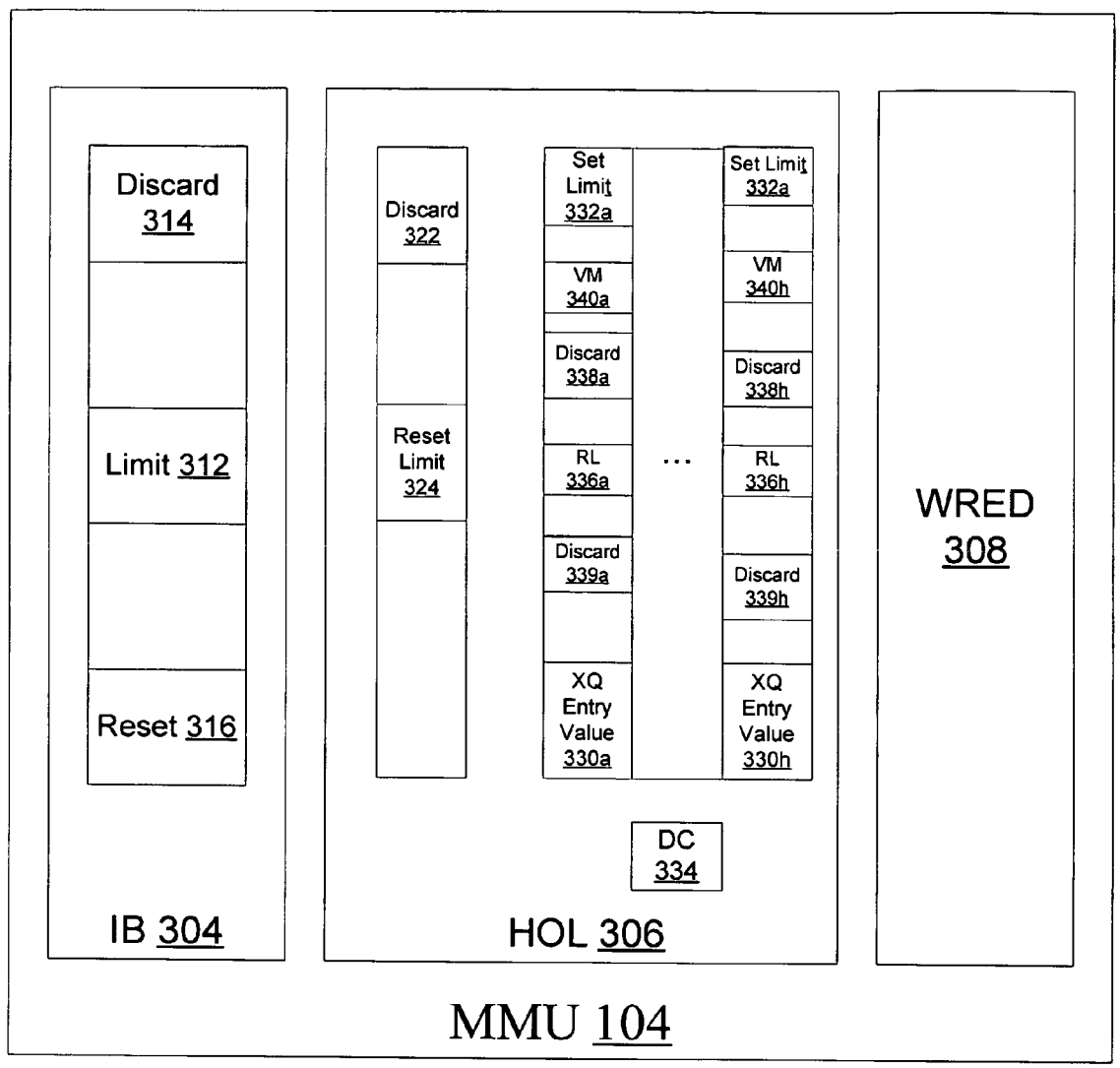
FIG. 3 illustrates buffer management mechanisms that are used by the memory management unit to impose resource allocation limitations and thereby ensure fair access to resource.

Once a packet enters device 100 on a source port 109, the packet is transmitted to ingress module 102 for processing. During processing, packets on each of the ingress and egress ports share system resources 202 and 204. FIG. 3 illustrates buffer management mechanisms that are used by MMU 104 to impose resource allocation limitations and thereby ensure fair access to resources. MMU 104 includes an ingress backpressure mechanism 304, a head of line mechanism 306 and a weighted random early detection mechanism 308. Ingress backpressure mechanism 304 supports lossless behaviour and manages buffer resources fairly across ingress ports. Head of line mechanism 306 supports access to buffering resources while optimizing throughput in the system. Weighted random early detection mechanism 308 improves overall network throughput.

Ingress backpressure mechanism 304 uses packet or cell counters to track the number of packets or cells used on an ingress port basis. Ingress backpressure mechanism 304 includes registers for a set of 8 individually configurable thresholds and registers used to specify which of the 8 thresholds are to be used for every ingress port in the system. The set of thresholds include a limit threshold 312, a discard limit threshold 314 and a reset limit threshold 316. If a counter associated with the ingress port packet/cell usage rises above discard limit threshold 314, packets at the ingress port will be dropped. Based on the counters for tracking the number of cells/packets, a pause flow control is used to stop traffic from arriving on an ingress port that have used more than its fair share of buffering resources, thereby stopping traffic from an offending ingress port and relieving congestion caused by the offending ingress port. Specifically, each ingress port keeps track of whether or not it is in an ingress backpressure state based on ingress backpressure counters relative to the set of thresholds. When the ingress port is in ingress backpressure state, pause flow control frames with a timer value of (0xFFFF) are periodically sent out of that ingress port. When the ingress port is no longer in the ingress backpressure state, the pause flow control frame with a timer value of 0x00 is sent out of the ingress port and traffic is allowed to flow again. If an ingress port is not currently in an ingress backpressure state and the packet counter rises above limit threshold 312, the status for the ingress port transitions into the ingress backpressure state. If the ingress port is in the ingress backpressure state and the packet counter falls below reset limit threshold 316, the status for the port will transition out of the backpressure state.

Head of line mechanism 306 is provided to support fair access to buffering resources while optimizing throughput in the system. Head of line mechanism 306 relies on packet dropping to manage buffering resources and improve the overall system throughput. According to an embodiment of the invention, head of line mechanism 306 uses egress counters and predefined thresholds to track buffer usage on a egress port and class of service basis and thereafter makes decisions to drop any newly arriving packets on the ingress ports destined to a particular oversubscribed egress port/class of service queue. Head of line mechanism 306 supports different thresholds depending on the color of the newly arriving packet. Packets may be colored based on metering and marking operations that take place in the ingress module and the MMU acts on these packets differently depending on the color of the packet.

According to an embodiment of the invention, head of line mechanism 306 is configurable and operates independently on every class of service queue and across all ports, including the CPU port. Head of line mechanism 306 uses counters that track XQ memory 204 and CBP memory 202 usage and thresholds that are designed to support a static allocation of CBP memory buffers 202 and dynamic allocation of the available XQ memory buffers 204. A discard threshold 322 is defined for all cells in CBP memory 202, regardless of color marking. When the cell counter associated with a port reaches discard threshold 322, the port is transition to a head of line status. Thereafter, the port may transition out of the head of line status if its cell counter falls below a reset limit threshold 324.

For the XQ memory 204, a guaranteed fixed allocation of XQ buffers for each class of service queue is defined by a XQ entry value 330a-330h. Each of XQ entry value 330a-330h defines how many buffer entries should be reserved for an associated queue. For example, if 100 bytes of XQ memory are assigned to a port, the first four class of service queues associated with XQ entries 330a-330d respectively may be assigned the value of 10 bytes and the last four queues associated with XQ entries 330d-330h respectively may be assigned the value of 5 bytes. According to an embodiment of the invention, even if a queue does not use up all of the buffer entries reserved for it according to the associated XQ entry value, head of line mechanism 306 may not assign the unused buffer to another queue. Nevertheless, the remaining unassigned 40 bytes of XQ buffers for the port may be shared among all of the class of service queues associated with the port. Limits on how much of the shared pool of the XQ buffer may be consumed by a particular class of service queue is set with a XQ set limit threshold 332. As such, set limit threshold 332 may be used to define the maximum number of buffers that can be used by one queue and to prevent one queue from using all of the available XQ buffers. To ensure that the sum of XQ entry values 330a-330h do not add up to more than the total number of available XQ buffers for the port and to ensure that each class of service queue has access to its quota of XQ buffers as assigned by its entry value 330, the available pool of XQ buffer for each port is tracked using a port dynamic count register 334, wherein dynamic count register 334 keeps track of the number of available shared XQ buffers for the port. The initial value of dynamic count register 334 is the total number of XQ buffers associated with the port minus a sum of the number of XQ entry values 320a-320h. Dynamic count register 334 is decremented when a class of service queue uses an available XQ buffer after the class of service queue has exceeded its quota as assigned by its XQ entry value 330. Conversely, dynamic count register 334 is incremented when a class of service queue releases a XQ buffer after the class of service queue has exceeded its quota as assigned by its XQ entry value 330.

When a queue requests XQ buffer 204, head of line mechanism 306 determines if all entries used by the queue is less than the XQ entry value 330 for the queue and grants the buffer request if the used entries are less then the XQ entry value 330. If however, the used entries are greater than the XQ entry value 330 for the queue, head of line mechanism 306 determines if the amount requested is less than the total available buffer or less then the maximum amount set for the queue by the associated set limit threshold 332. Set limit threshold 332 is in essence a discard threshold that is associated with the queue, regardless of the color marking of the packet. As such, when the packet count associated with the packet reaches set limit threshold 332, the queue/port enters into a head of line status. When head of line mechanism 306 detects a head of line condition, it sends an update status so that ingress module 102 can drop packets on the congested port. However, due to latency, there may be packets in transition between ingress module 102 and MMU 104 when the status update is sent by head of line mechanism 306. In this case, the packet drops may occur at MMU 104 due to the head of line status. In an embodiment of the invention, due to the pipeline of packets between ingress module 102 and MMU 104, the dynamic pool of XQ pointers is reduced by a predefined amount. As such, when the number of available XQ pointers is equal to or less than the predefined amount, the port is transition to the head of line status and an update status is sent to by MMU 104 to ingress module 102, thereby reducing the number of packets that may be dropped by MMU 104. To transition out of the head of line status, the XQ packet count for the queue must fall below a reset limit threshold 336.

It is possible for the XQ counter for a particular class of service queue to not reach set limit threshold 332 and still have its packet dropped if the XQ resources for the port are oversubscribed by the other class of service queues. In an embodiment of the invention, intermediate discard thresholds 338 and 339 may also be defined for packets containing specific color markings, wherein each intermediate discard threshold defines when packets of a particular color should be dropped. For example, intermediate discard threshold 338 may be used to define when packets that are colored yellow should be dropped and intermediate discard threshold 339 may be used to define when packets that are colored red should be dropped. According to an embodiment of the invention, packets may be colored one of green, yellow or red depending on the priority level assigned to the packet. To ensure that packets associated with each color are processed in proportion to the color assignment in each queue, one embodiment of the present invention includes a virtual maximum threshold 340. Virtual maximum threshold 340 is equal to the number of unassigned and available buffers divided by the sum of the number of queues and the number of currently used buffers. Virtual maximum threshold 340 ensures that the packets associated with each color are processed in a relative proportion. Therefore, if the number of available unassigned buffers is less than the set limit threshold 332 for a particular queue and the queue requests access to all of the available unassigned buffers, head of line mechanism 306 calculates the virtual maximum threshold 340 for the queue and processes a proportional amount of packets associated with each color relative to the defined ratios for each color.

To conserve register space, the XQ thresholds may be expressed in a compressed form, wherein each unit represents a group of XQ entries. The group size is dependent upon the number of XQ buffers that are associated with a particular egress port/class of service queue.

Weighted random early detection mechanism 308 is a queue management mechanism that preemptively drops packets based on a probabilistic algorithm before XQ buffers 204 are exhausted. Weighted random early detection mechanism 308 is therefore used to optimize the overall network throughput. Weighted random early detection mechanism 308 includes an averaging statistic that is used to track each queue length and drop packets based on a drop profile defined for the queue. The drop profile defines a drop probability given a specific average queue-size. According to an embodiment of the invention, weighted random early detection mechanism 308 may defined separate profiles on based on a class of service queue and packet.

Figure 4:
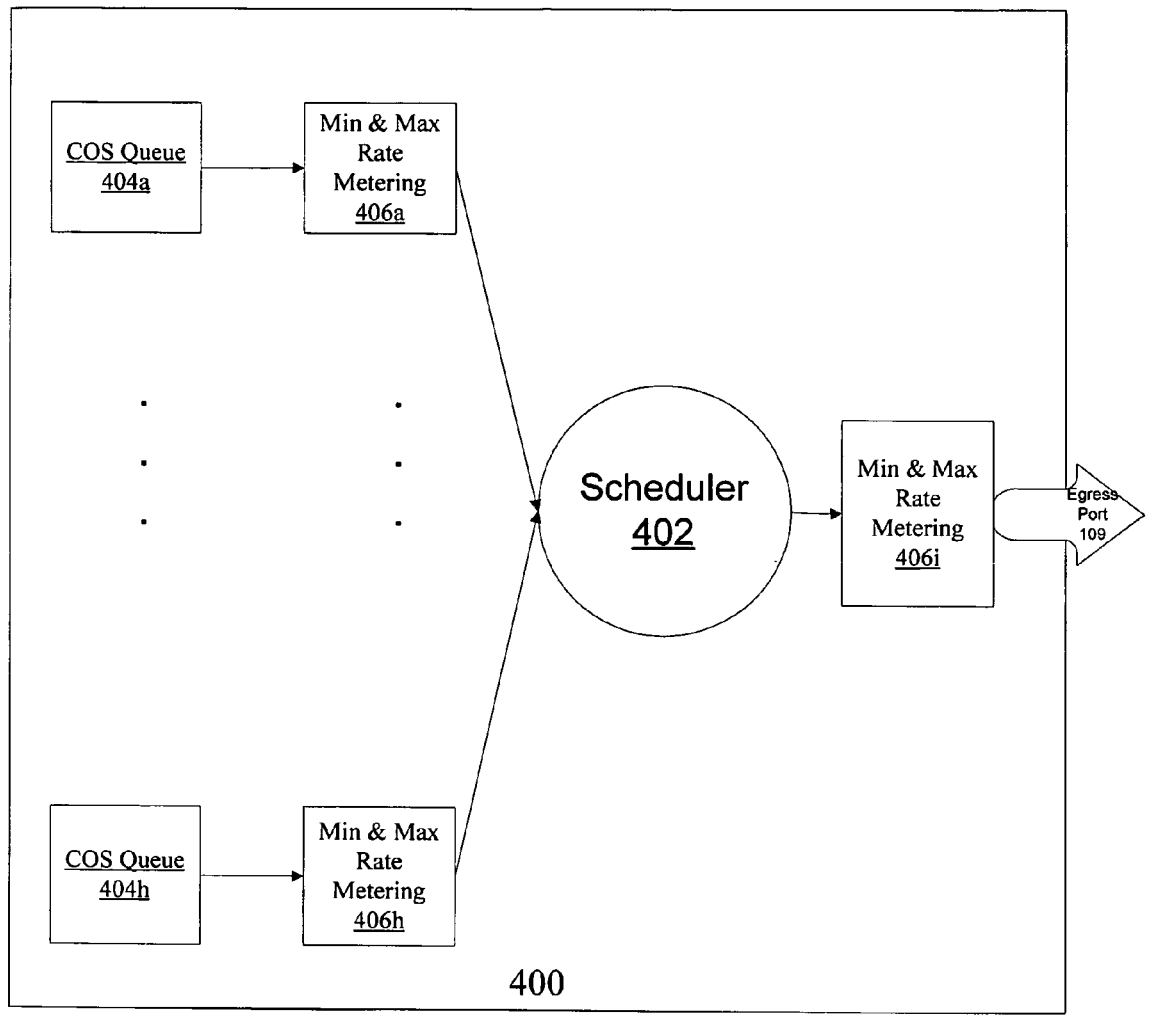
FIG. 4 illustrates a configuration of an egress port arbitration implemented in the present invention.

FIG. 4 illustrates a configuration of an egress port arbitration implemented in the present invention. According to FIG. 4, MMU 104 also includes a scheduler 402 that provides arbitration across the eight class of service queues 404a-404h associated with each egress port to provide minimum and maximum bandwidth guarantees. Scheduler 402 is integrated with a set of minimum and maximum metering mechanisms 406a-406i that monitor traffic flows on a class of service basis and an overall egress port basis. Metering mechanisms 406a-406i support traffic shaping functions and guarantee minimum bandwidth specifications on a class of service queue and/or egress port basis, wherein scheduling decisions by schedule 402 are configured largely via traffic shaping mechanisms 406a-406h along with a set of control masks that modify how scheduler 402 uses traffic shaping mechanisms 406a-406h.

As shown in FIG. 4, minimum and maximum metering mechanisms 406a-406i monitor traffic flows on a class of service queue basis and an overall egress port basis. Maximum and minimum bandwidth meters 406a-406h are used to feed state information to scheduler 402 which responds by modifying its service order across class of service queues 404. The inventive device 100 therefore enables system vendors to implement a quality of service model by configuring class of service queues 404 to support an explicit minimum and maximum bandwidth guarantee. In an embodiment of the invention, metering mechanisms 406a-406h monitor traffic flow on a class of service queue basis, provides state information regarding whether or nor a class of service flow is above or below a specified minimum and maximum bandwidth specification, and transmits the information into scheduler 402 which uses the metering information to modify its scheduling decisions. As such, metering mechanisms 406a-406h aid in partitioning class of service queues 404 into a set of queues that have not met the minimum bandwidth specification, a set that have met its minimum bandwidth but not its maximum bandwidth specification and a set that have exceeded its maximum bandwidth specification. If a queue is in the set that have not met its minimum bandwidth specification and there are packets in the queue, scheduler 402 services the queue according to the configured scheduling discipline. If a queue is in the set that have met its minimum bandwidth specification but has not exceeded it maximum bandwidth specification and there are packets in the queue, scheduler 402 services the queue according to the configured scheduling discipline. If a queue is in the set that have exceeded its maximum bandwidth specification or if the queue is empty, scheduler 402 does not service the queue.

Figure 5:
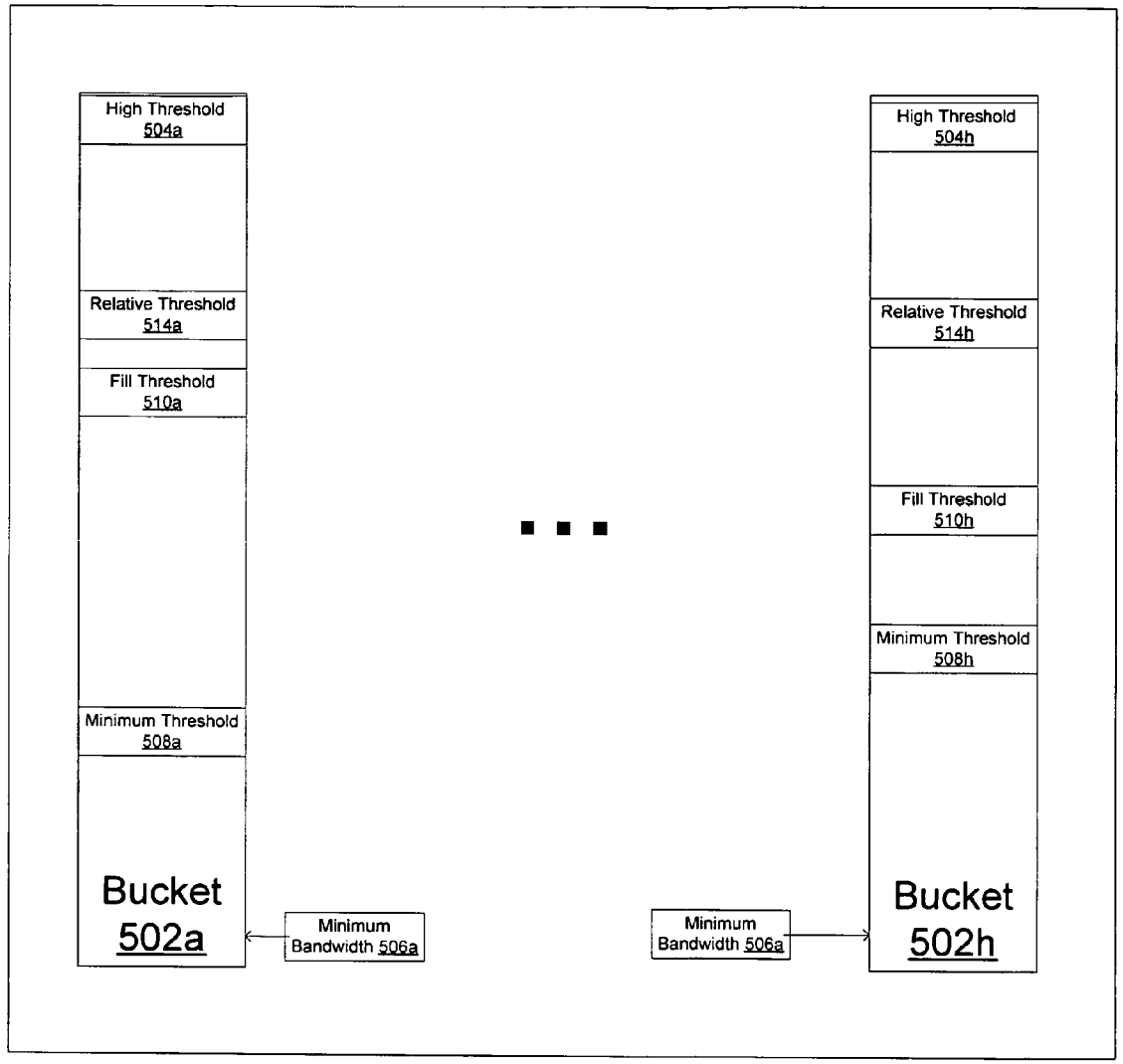
FIG. 5 illustrates the implementation of the minimum and maximum bandwidth metering mechanisms.

In an embodiment of the invention, as illustrated in FIG. 5, minimum and maximum bandwidth metering mechanisms 406a-406h are implemented using a simple leaky bucket mechanism which tracks whether or not a class of service queue 404 has consumed its minimum or maximum bandwidth. The range of the minimum and maximum bandwidth setting for each class of service 404 is between 64 kbps to 16 Gbps, in 64 kbps increments. The leaky bucket mechanism has a configurable number of tokens "leaking" out of bucket 502a-502h, each of which is associated with one of queues 404a-404h, at a configurable rate. In metering the minimum bandwidth for a class of service queue 404, as packets enter the class of service queue 404, a number of tokens in proportion to the size of the packet is added to bucket 502, with a ceiling of bucket high threshold 504. The leaky bucket mechanism includes a refresh update interface and a minimum bandwidth 506 which defines how many tokens are to be removed every refresh time unit. A minimum threshold 508 is set to indicate whether a flow has satisfied at least its minimum rate and a fill threshold 510 is set to indicate how many tokens are in leaky bucket 502. When fill threshold 510 rises above minimum threshold 508, a flag which indicates that the flow has satisfied its minimum bandwidth specification is set to true. When fill threshold 510 falls below minimum threshold 508, the flag is set to false.

Minimum threshold 508 affects what timescale the minimum bandwidth metering mechanism 406 is required to operate. If the minimum threshold 508 is set at a very low level, class of service queue 404 will quickly flag that its minimum bandwidth has been met. This reduces the amount of time queue 404 is classified in the set of queues that have not met the minimum bandwidth requirement and reduces the time period that the queue is given preferential treatment from scheduler 402. High threshold 504 affects how much credit can be built up after a class of service queue meets it minimum bandwidth 506. A large high threshold 504 may result in a reduction of time that the queue is classified with the set of queues that have not met the minimum bandwidth requirement and reduces the time period that the queue is given preferential treatment from scheduler 402.

After metering mechanisms 406a-406h indicate that the maximum bandwidth specified has been exceeded high threshold 504, scheduler 402 ceases to service the queue and the queue is classified as being in the set of queues that have exceeded it maximum bandwidth specification. A flag is then set to indicate that the queue has exceeded its maximum bandwidth. Thereafter, the queue will only receive service from scheduler 402 when its fill threshold 510 falls below high threshold 504 and the flag indicating that it has exceeded its maximum bandwidth is reset. Metering mechanism 406i is used to indicate that the maximum bandwidth specified for a port has been exceeded and operates in the same manner as meter mechanisms 406a-406h when the maximum bandwidth has been exceeded. According to an embodiment of the invention, the maximum metering mechanism on a queue and port basis generally affects whether or not queue 404 or a port is to be included in scheduling arbitration. As such, the maximum metering mechanism only has a traffic limiting effect on scheduler 402.

On the other hand, minimum metering on a class of service queue 404 basis has a more complex interaction with scheduler 402. In one embodiment of the invention, scheduler 402 is configured to support a variety of scheduling disciplines that mimic the bandwidth sharing capabilities of a weighted fair queuing scheme. The weighted fair queue scheme is a weighted version of packet based fair queuing scheme, which is defined as a method for providing "bit-based round robin" scheduling of packets. As such, packets are scheduled for access to an egress port based on their delivery time, which is computed as if the scheduler is capable of providing bit-based round robin service. A relative weight field influences the specifics of how the scheduler makes use of the minimum metering mechanism, wherein the scheduler attempts to provide a minimum bandwidth guarantee. In an embodiment of the invention, the minimum bandwidth guarantee is a relative bandwidth guarantee wherein a relative field determines whether or not scheduler 402 will treat the minimum bandwidth metering settings as a specification for a relative or an absolute bandwidth guarantee. If the relative field is set, the scheduler treats minimum bandwidth 506 setting as a relative bandwidth specification. Scheduler 402 then attempts to provide relative bandwidth sharing across backlogged queues 404.

Figure 6:
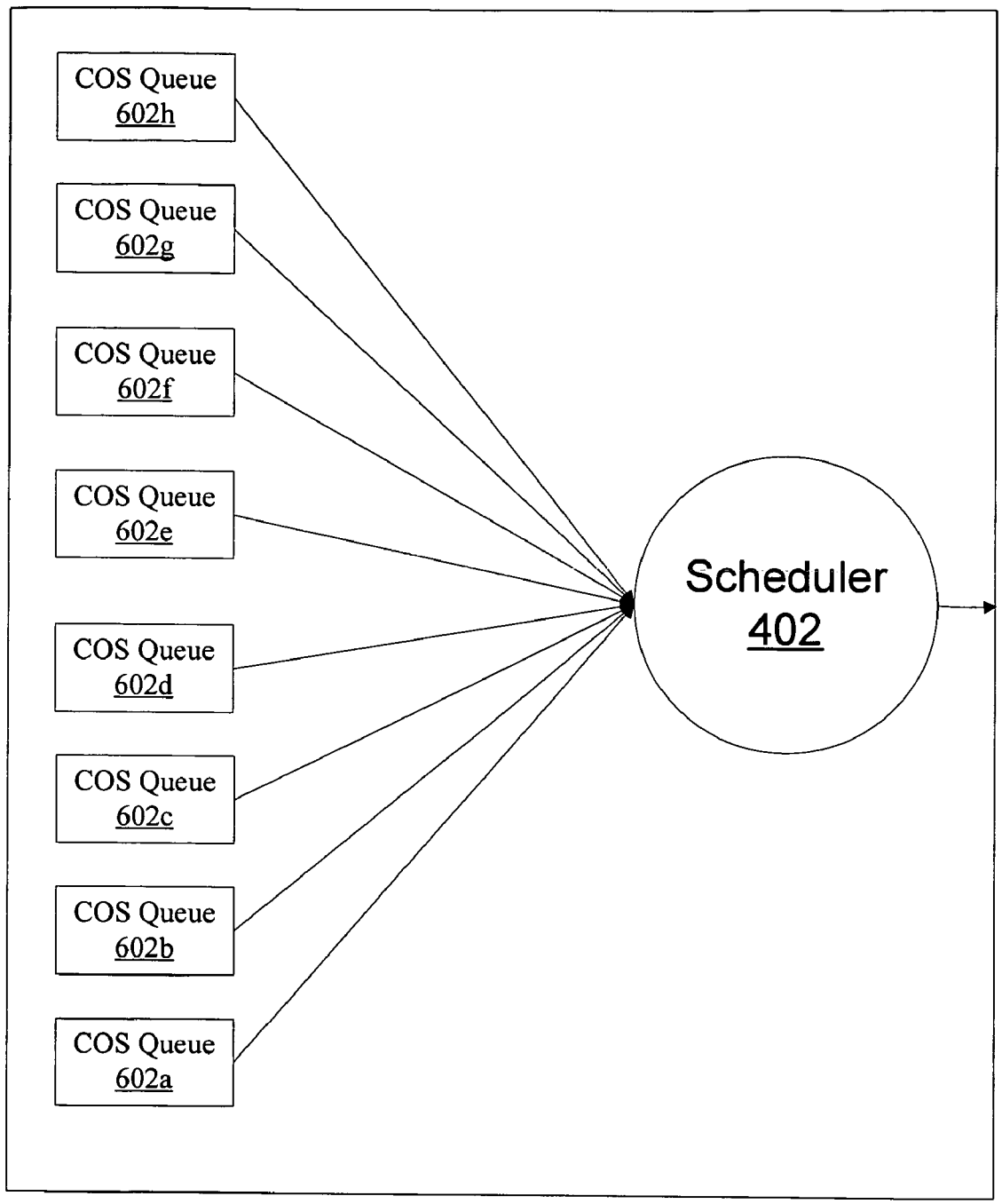
FIG. 6 illustrates an embodiment in which four queues are serviced according to their minimum bandwidth specifications.

FIG. 6 illustrates an embodiment in which four queues are serviced according to their minimum bandwidth specifications. According to FIG. 6, a 1 GE egress port has scheduler 402 configured to be in a weighted fair queue mode and has its relative field set to true, wherein the minimum bandwidth for queue 602a and 602b is 10 Mbps, for queue 602c is 20 Mbps and for queue 602d is 40 Mbps. If all queues 602 have packets to be serviced, then scheduler 402 will provide relative bandwidth sharing across the active queues according to the predefined minimum bandwidth for each queue. However, since as mentioned above only queues 602a-602d have packets to be serviced, queue 602d will receive twice the bandwidth of queue 602c which receives twice the bandwidth that is given to queues 602a and 602b. If queues 602a-602d have enough packets to keep the 1 GE link fully utilized, queue 602d will be allowed to process 500 Mbps, queue 602c will be allowed to process 250 Mbps and queues 602a and 602b will be allowed to process 125 Mbps. On the other hand, if only queues 602b-602d are active, the bandwidth distribution will change to appropriately provide relative bandwidth sharing, wherein queue 602d will be allowed to process 571.4 Mbps, queue 602c will be allowed to process 265.7 Mbps and queue 602b will be allowed to process 142.9 Mbps. As such, minimum bandwidth metering mechanisms 406 are constantly being adjusted to achieve the relative bandwidth sharing.

Returning to FIG. 5, according to an embodiment of the invention, in addition to the relative field, a relative threshold 514 is also set in each of queues 404. Relative threshold 514 is used to indicate that the minimum bandwidth 506 is set too low when fill threshold 510 of all queues have exceeded relative threshold 514. As such, when fill threshold 510 for each of queues 404a-404h rises above relative threshold 514, device 100 calculates a new minimum bandwidth 506, wherein:

$$\text{new minimum bandwidth} = \text{old minimum bandwidth} << (K - MSB.POS)$$

wherein K is equal to a constant, and
MSB.POS is equal to a position of the Most Significant Bit The new minimum bandwidth therefore allows device 100 to leak more tokens out of bucket 502 for each of queues 404a-404h, wherein the new leak is proportional to the old leak. According to another embodiment of the invention, the new minimum bandwidth may be calculated for an individual queue when fill threshold for that queue rises above relative threshold 514 for that queue.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed:

1. A network device for scheduling packets in a plurality of queues, the network device comprising:
   means for processing information in one of a plurality of queues based on a predefined bandwidth, wherein a scheduler services an associated one of the plurality of queues based on the predefined bandwidth; and
   means for tracking whether or not a plurality of active queues of the plurality of queues has exceeded a predefined threshold, the predefined threshold being used to indicate that the predefined bandwidth for each of the plurality of active queues is set too low when a fill threshold associated with each of the plurality of active queues exceeds the predefined threshold,
   wherein only if the fill threshold of all of the plurality of active queues have exceeded the predefined threshold, a new bandwidth allocation is calculated for each of the plurality of active queues, the new bandwidth allocation replacing the predefined bandwidth and being proportional to the predefined bandwidth for each of the plurality of active queues.

2. The network device according to claim 1, wherein the processing means performs leaky bucket algorithms with each of the plurality of active queues.

3. The network device according to claim 1, wherein the processing means further performs accepting a number of tokens in proportion to the size of a packet being added to the associated queue.

4. The network device according to claim 1, the processing means use the predefined bandwidth to determine how many tokens to release at predetermined time intervals.

5. The network device according to claim 1, wherein the means for processing comprises a plurality of thresholds for indicating predefined points in the means for processing.

6. The network device according to claim 1, wherein the means for tracking is configured to compare a fill rate in each of the plurality of active queues with the predefined threshold to determine if each of the plurality of active queues have exceeded the predefined threshold.

7. The network device according to claim 1, wherein the scheduler is further configured to process each of the plurality of active queues according to a relative weight field, wherein the relative weight field determines if the predefined bandwidth for each of the plurality of active queues is a relative bandwidth guarantee or an absolute bandwidth guarantee.

8. A network device for scheduling packets in a plurality of queues, the network device comprising:
   means for processing information in one of a plurality of queues based on a predefined bandwidth, wherein a scheduler services an associated one of the plurality of queues based on the predefined bandwidth; and
   means for tracking whether or not a plurality of active queues of the plurality of queues has exceeded a predefined threshold,
   wherein if the plurality of active queues has exceeded the predefined threshold, a new bandwidth allocation is calculated for each of the plurality of active queues, the new bandwidth allocation replacing the predefined bandwidth and being proportional to the predefined bandwidth for each of the plurality of active queues,
   wherein the means for tracking is configured to calculate the new bandwidth allocation for each of the plurality of active queues as the predefined bandwidth left shifted with the difference of a constant and the position of a most significant bit.

9. A method for scheduling packets in a plurality of queues, the method comprising the steps of:
   processing information in a plurality of queues based on a predefined bandwidth using a network device;
   tracking if a plurality of active queues of the plurality of queues has exceeded a predefined threshold, the predefined threshold being used to indicate that the predefined bandwidth for each of the plurality of active queues is set too low when a fill threshold associated with each of the plurality of active queues exceeds the predefined threshold; and
   calculating a new bandwidth allocation for each of the plurality of active queues only if the fill threshold of all of the plurality of active queues have exceeded the predefined threshold, the new bandwidth allocation replacing the predefined bandwidth and being proportional to the predefined bandwidth for each of the plurality of active queues.

10. The method according to claim 9, further comprising a leaky bucket algorithm with each of the plurality of active queues.

11. The method according to claim 9, further comprising a number of tokens in proportion to the size of a packet being added to an associated queue.

12. The method according to claim 9, further comprising using the predefined bandwidth to determine how many token to release at predetermined time intervals.

13. The method according to claim 9, further comprising comparing a fill rate in each of the plurality of active queues with the predefined threshold to determine if each of the plurality of active queues have exceeded the predefined threshold.

14. The method according to claim 9, further comprising processing each of the plurality of active queues according to a relative weight field, wherein the relative weight field determines if the predefined bandwidth for each of the plurality of active queues is a relative bandwidth guarantee or an absolute bandwidth guarantee.

15. A method for scheduling packets in a plurality of queues, the method comprising the steps of:
- processing information in a plurality of queues based on a predefined bandwidth using a network device;
- tracking if a plurality of active queues of the plurality of queues has exceeded a predefined threshold;
- calculating a new bandwidth allocation for each of the plurality of active queues if the plurality of active queues has exceeded the predefined threshold, the new bandwidth allocation replacing the predefined bandwidth and being proportional to the predefined bandwidth for each of the plurality of active queues; and
- calculating the new bandwidth allocation for each of the plurality of active queues as the predefined bandwidth left shifted with the difference of a constant and the position of a most significant bit.

16. An apparatus for scheduling packets in a plurality of queues, the apparatus comprising:
- configuring means for configuring information to be processed in a plurality of queues based on a predefined bandwidth;
- tracking means for tracking if a plurality of active queues of the plurality of queues has exceeded a predefined threshold, the predefined threshold being used to indicate that the predefined bandwidth for each of the plurality of active queues is set too low when a fill threshold associated with each of the plurality of active queues exceeds the predefined threshold; and
- calculating means for calculating a new bandwidth allocation for each of the plurality of active queues only if the fill threshold of all of the plurality of active queues have exceeded the predefined threshold, the new bandwidth allocation replacing the predefined bandwidth and being proportional to the predefined bandwidth for each of the plurality of active queues.

\* \* \* \* \*